Figure 1:
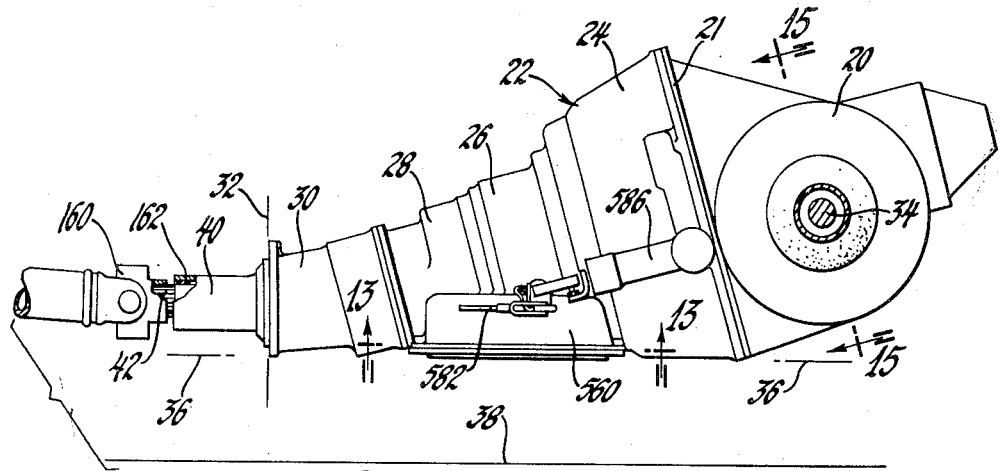

Sept. 11, 1962 G. K. HAUSE 3,053,361
TRANSMISSION

Original Filed April 24, 1957 5 Sheets-Sheet 1

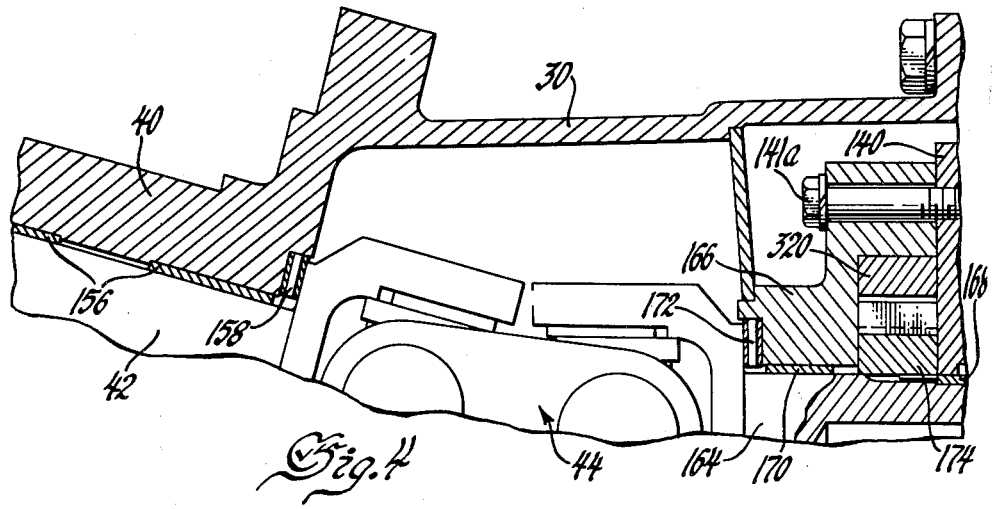
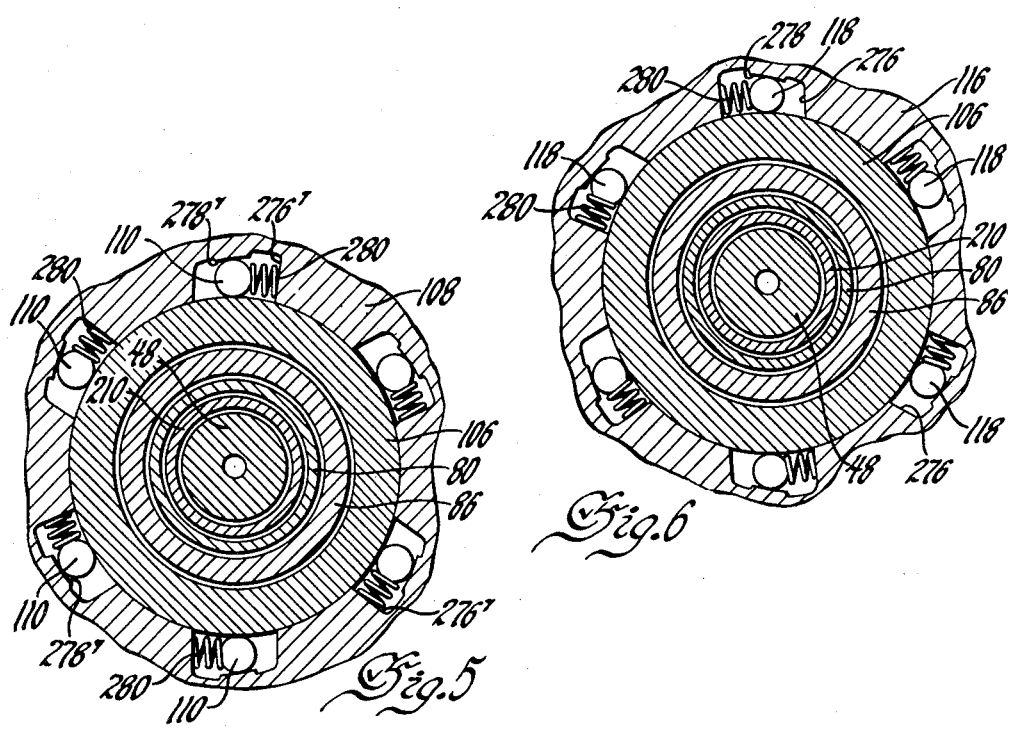

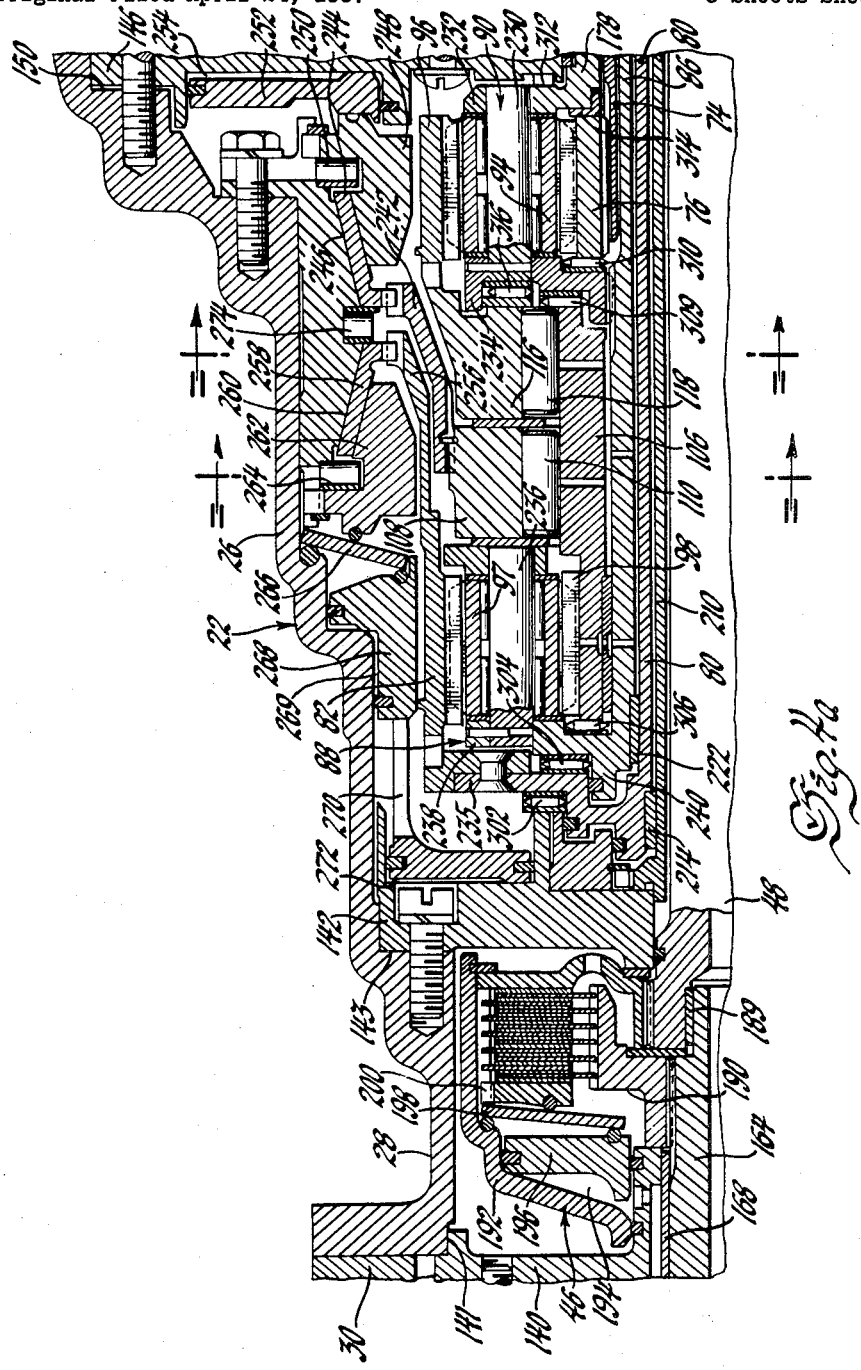

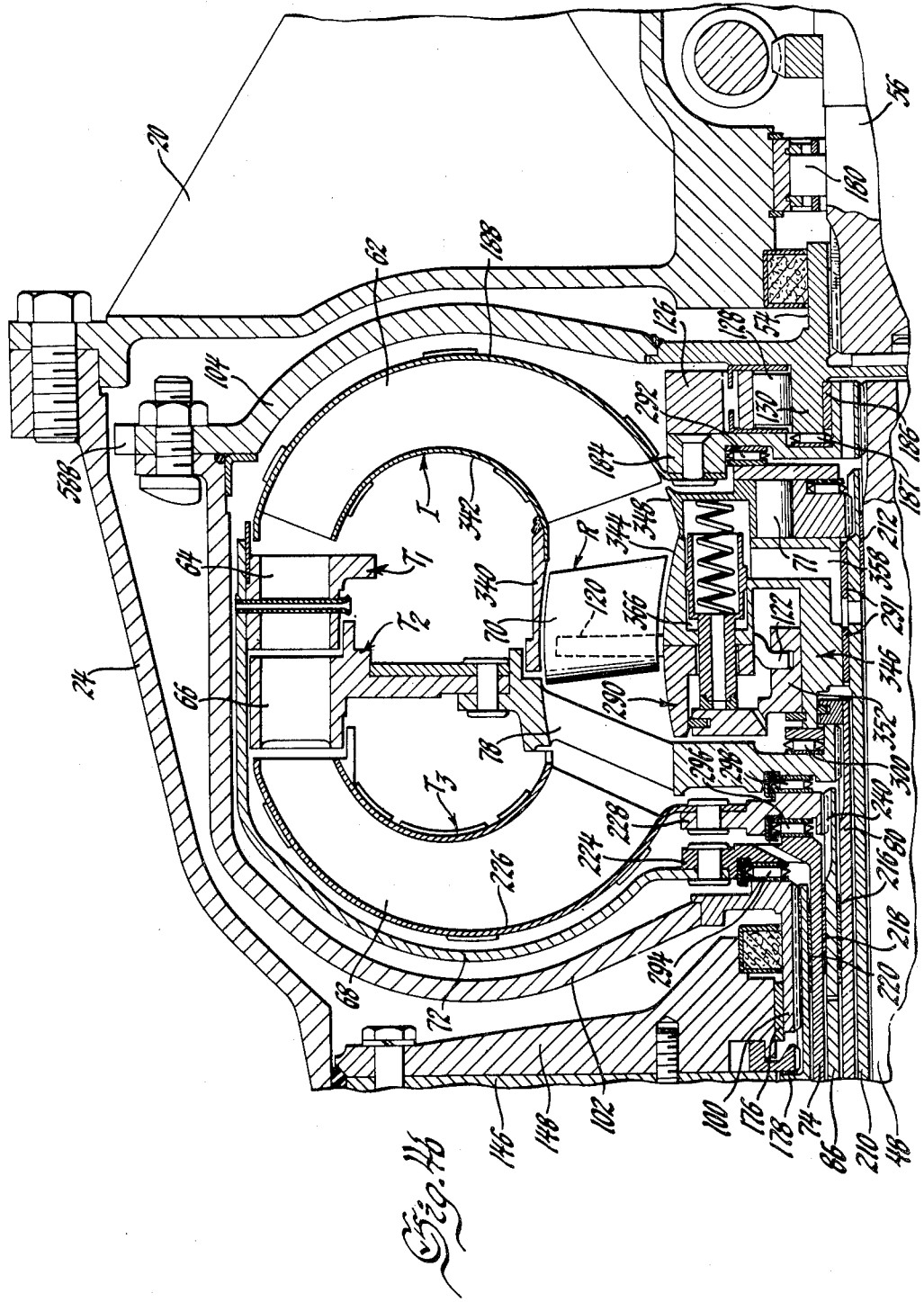

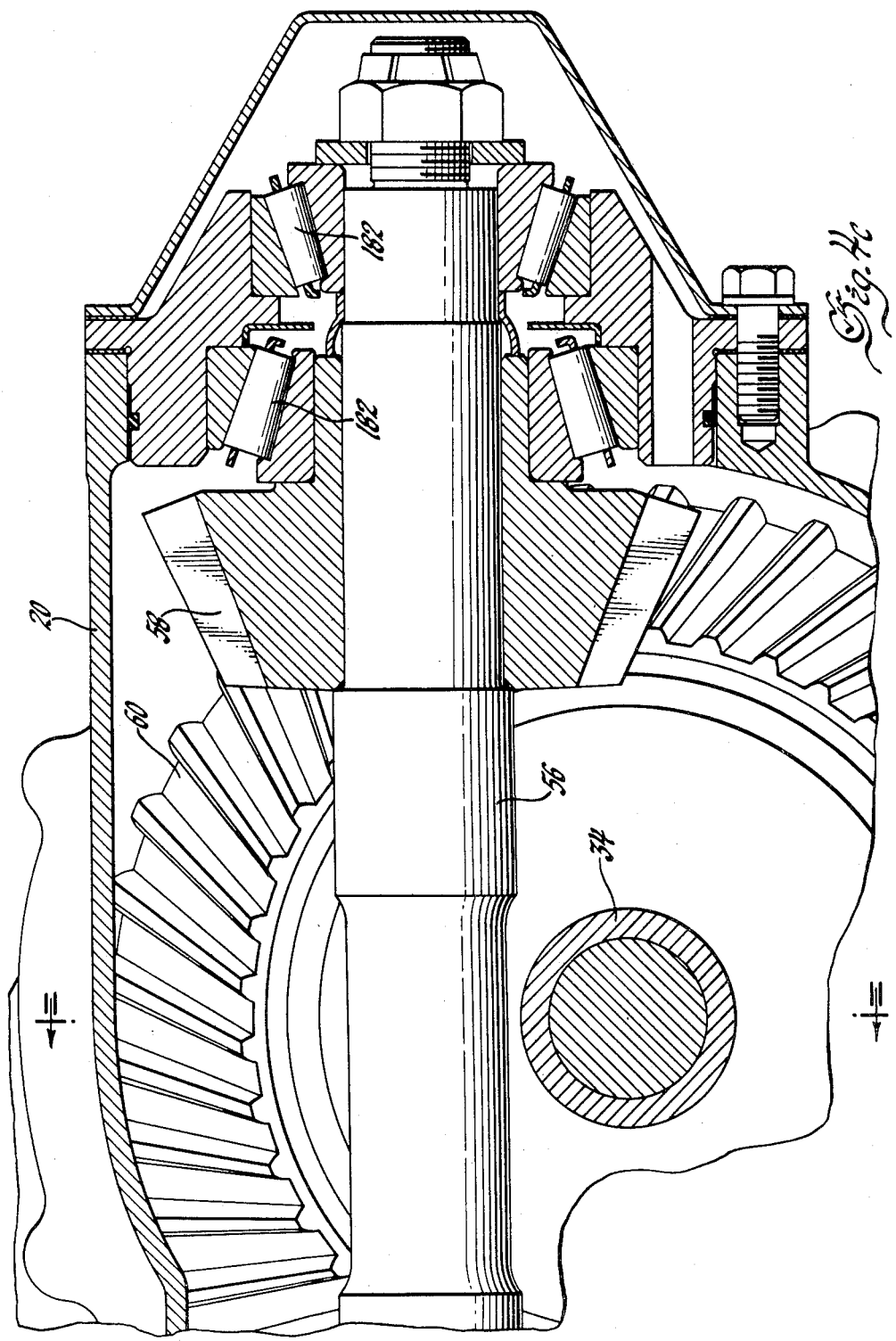

United States Patent Office 3,053,361
Patented Sept. 11, 1962

3,053,361
TRANSMISSION
Gilbert Kenneth Hause, Bloomfield Hills, Mich., assignor to General Motors Corporation, Detroit, Mich., a corporation of Delaware
Original application Apr. 24, 1957, Ser. No. 654,771. Divided and this application Sept. 8, 1959, Ser. No. 838,679
4 Claims. (Cl. 192—48)

This application is a division of my application, Serial Number 654,771 filed April 24, 1957.

This invention relates to transmissions and final drives for automobiles.

Car designers are now trying to make cars low while providing adequate ground clearance. When this was attempted with the types and arrangements of transmission, propeller shaft and differential housing formerly available, it required the transmission and propeller shaft to be placed above the floor level of the car. Therefore, a so-called tunnel was used to separate the drive line from the interior of the car. The tunnel is undesirable, and efforts have been made to eliminate it or reduce its height. One such effort involves a unitary assembly of the transmission housing and differential housing which is placed in the space under the rear seat and tilted about the axis of the rear wheels to lower the front end of the transmission. This lowers the propeller shaft.

It is among the objects of the invention to provide an advantageous combination of transmission and final drive assembly which is especially suited to the low car design outlined above, and to provide an improved and novel form of transmission which makes this combination possible.

More specifically, objects of the invention are to provide an improved and compact form of transmission which facilitates increasing the length of the propeller shaft for a given car design and thus improving the angle of the propeller shaft with respect to engine and transmission, and to provide a transmission which has low ground clearance while providing high torque and a high degree of torque multiplication.

It is also an object to provide an improved construction and arrangement of hydrodynamic torque transmitter which makes possible the use of an overrunning clutch between the input and output shafts and one which provides improved flow characteristics of working liquid through the torque transmitter, and especially through a reaction member.

These and other objects and advantages of the invention will appear in the following description and accompanying drawings.

Figure 2:
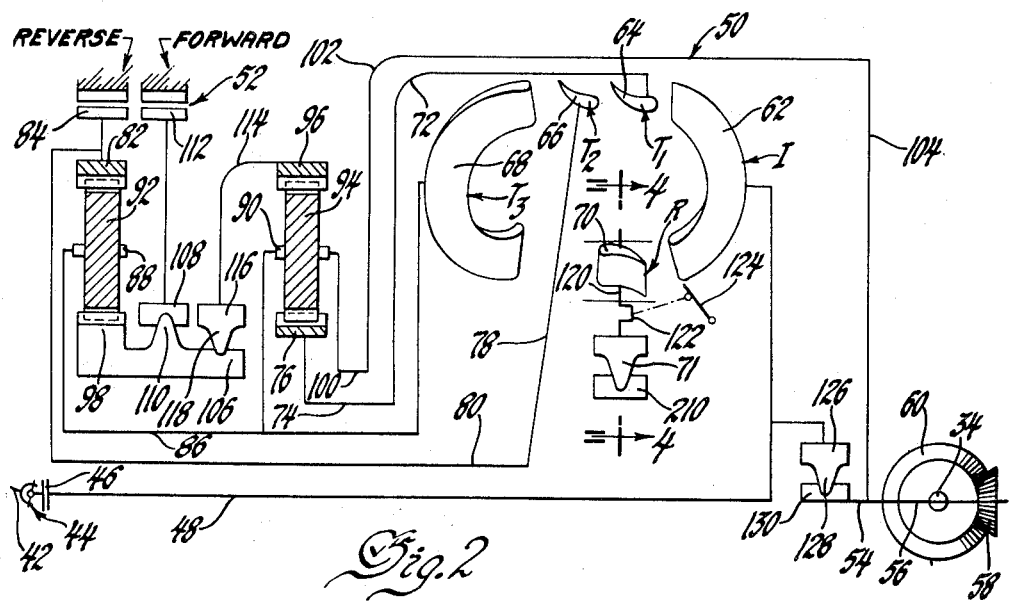
Figure 3:
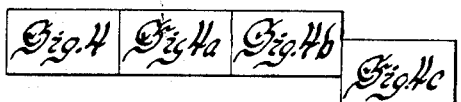

In the drawings:

FIG. 1 is a side elevation of a transmission and differential assembly embodying one form of the invention, showing the relationship of this assembly to the ground when the transmission is placed in a car, FIG. 2 is a schematic upper half of a longitudinal section which is symmetrical about the axis of rotation of a transmission and differential assembly embodying one form of the invention. In this and succeeding figures the transmission is shown with its axis parallel to the ground, for convenience in reading the drawings, this being a different position than shown in FIG. 1, FIG. 3 is a map showing the relative arrangement of the sheets of drawing which include FIGS. 4, 4A, 4B and 4C to constitute one-half of a structural section corresponding of FIG. 2, FIGS. 4, 4A, 4B, and 4C collectively form the upper half of a symmetrical, longitudinal section of an actual structure of a transmission and differential assembly embodying one form of the invention, FIG. 4 is a section through the front end of the assembly, including the universal joint and front pump, FIG. 4A is a section through the gearing, behind the front pump and in front of the torque converter, FIG. 4B is a section through the torque converter, in front of the differential, FIG. 4C is a section through the differential, and FIG. 5 is a section of a one-way clutch on the line 5—5 of FIG. 4A, and FIG. 6 is a section of another one-way clutch on the line 6—6 of FIG. 4A.

*General Arrangement*

Referring to FIG. 1 the transmission and differential assembly includes a differential housing 20 having a generally circular front wall 21 to which is bolted a transmission housing designated as a whole by 22 which includes a torque transmitter housing 24, a gear housing 26, a clutch housing 28 and may include a universal joint housing 30, all secured together in any suitable manner from rear to front in the order named.

The transmission housing 22 is of tapering form and can in general be contained within a truncated cone whose larger base is the front wall 21 of the differential housing 20, and whose smaller base is a circle in a plane whose trace in FIG. 1 is the line 32 at the front end of the universal joint housing 30. The entire assembly can be rotated about the axis of the drive axles 34 and may be placed in the car so that the lowermost geometrical element of the truncated cone, which element is represented by the broken line 36, is disposed substantially parallel to the level surface of the ground 38. This arrangement makes it possible for the largest part of the transmission housing to be placed in the space under the rear seat of a car without taking up any room above the normal lower surface of the car body and permits the customary propeller shaft of the car to enter the transmission housing at an angle to place the propeller shaft as low as possible with respect to the car body and thus reduce the height of, or eliminate, any tunnel in the car floor which may be necessary to accommodate the propeller shaft or its housing. To this end the universal joint housing includes a bearing retainer 40 for the drive shaft disposed at an angle to the axis of the transmission to receive a propeller shaft which is substantially parallel to the ground.

The transmission housing encloses a transmission schematically shown in FIG. 2 and structurally illustrated in FIGS. 4, 4A and 4B.

Referring to FIG. 2 a power input shaft 42, which may be connected to, or a part of, a customary propeller shaft driven by the engine of the car, is connected to a universal joint 44 which through clutch 46 can selectively be connected to or disconnected from a transmission input shaft 48 which drives a hydrodynamic torque transmitter, preferably a torque converter 50, which drives a planetary forward and reverse reduction gearing 52 physically disposed between the torque converter and the clutch 46. The gearing drives a transmissioin output shaft 54 connected to the input shaft 56 of the differential and driving the input pinion gear 58 which meshes with the differential ring gear 60 which drives the axles 34 of the rear wheels in any suitable known manner.

The invention includes novel features in the construction and arrangement of the torque converter, in the construction and arrangement of the reduction gearing separately and in combinaion with a torque converter, and in the arrangement of the torque converter and its output shaft with reference to the differential.

The torque converter includes a pump or impeller I of generally known form represented diagrammatically in FIG. 2 by a single blade 62 which may be rotated by the input shaft 48.

A first turbine $T_1$ is represented in FIG. 2 by a single blade 64 which receives liquid from the pump and discharges it to a second turbine $T_2$ represented by blade 66, which in turn discharges the liquid to a third turbine represented by blade 68 which returns the liquid to the impeller I through a stator or reaction member R represented by blades 70 and controlled for forward rotation only by a ratchet device 71.

The first turbine $T_1$ is connected by a drum 72 and shaft 74 to drive the input sun gear 76 of a first or rear planetary gear set. The second turbine $T_2$ is connected by a spider 78 and shaft 80 to drive the input ring gear 82 of a second or front planetary gear set. The ring gear can be held fast by a reverse ground clutch 84 to effect reverse drive, as will be explained. The third turbine $T_3$ is connected by a shaft 86 to drive the carriers 88 and 90, respectively, of the front and rear planetary gear sets, which carriers support front planetary pinions 92 meshing with the front input ring gear 82 and rear planetary pinions 94 which mesh with the rear input sun gear 76. A rear reaction ring gear 96 meshing with planet pinions 94 completes the rear planetary gear set, and a reaction sun gear 98 meshing with the planet pinions 92 completes the front planetary gear set.

The $T_3$ shaft 86 is the principal output shaft of the torque converter, and through carrier 90 it is connected to a transmission output member 100 physically located between the torque converter and the gearing. A drum 102 and flange 104 collectively form a casing surrounding the torque converter which casing connects the output member 100 to the transmission ouptut shaft 54.

Heretofore the various definitions of the terms clutch and brake have caused confusion. Some attempts to define the terms have been based on use or function regardless of structure while others have been based on type of structure or arrangement, regardless of use or function. This has sometimes led to the definitions of clutch and brake being mutually exclusive where they should not be, and has led to overlapping definitions where mutual exclusion was intended. None of these definitions which have come to my attention have satisfactorily taken care of the situation in which an identical specimen is sometimes a brake and sometimes a clutch. Neither do they adequately describe a situation in which it is immaterial whether a member is a brake or a clutch as described by reference to structure where the point in interest is the function of the device regardless of its structure. To avoid this confusion and indefiniteness the term clutch is used herein generically to mean any device which can be engaged to prevent rotation between two members which otherwise are relatively rotatable. If both members are rotatable absolutely the clutch when engaged forces them to rotate at the same speed so that one member drives the other. In this case the generic clutch may be defined more specifically as a drive clutch. If one of the members is fixed then engagement of the clutch holds the other member fast, in which case the generic clutch may be specifically defined as a ground clutch, which is one form of brake or lock. Where the clutch prevents relative rotation between two members in one sense but permits relative rotation in the opposite sense then the clutch may be subgenerically defined as a one-way clutch or ratchet device which is used to mean any device between two relatively rotatable members which permits the first member to rotate in one sense with respect to the second member but prevents the first member from rotating in the opposite sense with respect to the second member, that is locks the two members together. This device is sometimes called a freewheeler. If both members are rotatable absolutely the freewheeler is a one-way drive clutch. If one of the members cannot rotate, the freewheeler becomes a one-way ground clutch or one-way brake, the term used herein to denote both a species of one-way clutch and also a species of brake.

The sun gear 98 is formed integral with a freewheeler member 106, the upper half of which, as represented in FIG. 2 can turn forward, that is out of the plane of the paper toward the eye of the observer with respect to a second freewheeler member 108. The freewheeler is completed, as symbolically represented in FIG. 2, by a ratchet member 110 which is fixed to the member 106 and engages the member 108 if the member 106 tends to rotate backward. The member 108 is rotationally fixed to a forward brake 112 which can be held to prevent rotation of the freewheeler element 108. When this occurs the sun gear 98 is positively held against reverse rotation but may rotate forward with respect to the ratchet device 106—110—108. The rear ring gear 96 is rotationally fixed through a drum 114 to a member 116 of a second ratchet device having a ratchet element 118 which engages the member 106 whenever the member 116 tends to rotate backward but permits the ratchet member 116 to rotate forward out of the plane of the paper toward the eye of the observer with respect to the ratchet member 106. In the structure described herein the freewheelers 106—110—108 and 106—118—116 are both generically one-way clutches. Both freewheelers always function as the species one-way ground clutch or brake when the forward brake 112 is set. However, when the forward brake 112 is released and the reverse brake 84 is set, the ring gear 96 can drive the sun gear 98 backward through the freewheeler 106—118—116 which functions as a one-way drive clutch but not as a one-way brake The stator blades 70 are each mounted on a spindle 120 having a crank 122 suitably connected to the throttle 124 of the engine which drives the car so that the blades can be positioned to vary with the torque demand on the engine the range of torque multiplication effected by the torque converter.

In order to prevent the car running faster than the engine and thus in order to provide engine braking, I place a freewheeler between the input shaft 48 and the output shaft 54. This is represented schematically in FIG. 2 by the member 126 secured to the drive shaft 48 and fixed to a ratchet member 128 which engages member 130 secured to the shaft 54. Whenever the output shaft tends to rotate faster than the input shaft 48, the freewheeler 130—128—126 locks to cause the car to drive the engine.

*Operation of General Arrangement*

The arrangement described operates as follows:

Assume that the input shaft 42 is driven by the idling engine of an automobile, that the neutral clutch 46 is engaged and that the car is at rest. The impeller I is rotating slowly.

For forward drive the brake 112 is set and the reverse brake 84 is released. When the engine is speeded up the impeller I circulates liquid thru the turbines and impresses torque upon them. Initially the stationary axles 34 hold the carriers 88 and 90 and the turbine $T_3$ stationary. $T_1$ drives the rear input sun gear 76 forward. Because the rear carrier 90 is momentarily held stationary the rear pinions 94 attempt to drive the rear reaction ring gear 96 backward. This is prevented by the brake 112 and the two freewheelers 106—118—116 and 106—110—108 both acting as one-way brakes. The rear or inner race 116 locks the ratchet element to the center race 106 which locks the ratchet element 110 to the front or outer race 108, which is held. Consequently the ring gear 96 acts as a reaction gear and the carrier 90 is driven slowly forward, multiplying the torque impressed on turbine $T_1$ by the ratio or mechanical advantage of the rear planetary gear set. This motion of the carrier 90 drives the car and also positively drives forward the front carrier 88 and the third turbine $T_3$ regardless of hydraulic conditions in the torque converter. $T_1$ while exerting its positive drive necessarily runs faster than the output member 100 and turbine $T_3$ as determined by the ratio of the rear planetary gear set.

In addition, oil flowing from $T_1$ to $T_2$ exerts torque on $T_2$ which through shaft 80 drives the front ring gear 82 forward, tending to rotate the front pinions 92 forward, and when the ring gear 82 rotates fast enough, tending to rotate the front reaction sun gear 98 backward. This is prevented by the front one-way brake 106—110—108 which has previously been locked by the rear reaction ring gear 96. Consequently, the front ring gear 82 runs at a speed faster than the speed of the carriers as determined by the ratio of the front planetary unit and adds its torque to the output member 100.

On starting the car, and below some definite speed depending upon the design of the blades of the torque converter, the third turbine $T_3$ may not exert any positive or forward torque derived from the circulating liquid, but as previously stated it is positively driven by the carriers. However, at some relative speed of input shaft to output shaft positive hydraulic torque is impressed on $T_3$ and its possible speed due to hydraulic action gradually increases and tends to exceed the actual speed of the carriers driven by the other turbines. At this point $T_3$ assists in driving the car by torque exerted on the main drive line composed of shaft 86, carrier 90, output member 100, shell 102, flange 104, output shaft 54 and differential shaft 56. As the speed of the car increases from standstill two things happen successively. First, the torque delivered to the output member 100 by $T_1$ through the rear planetary unit drops to a vanishing point as $T_1$ reaches its terminal speed. When the speed of $T_1$ divided by the torque multiplying ratio of the rear planetary unit becomes less than the speed of $T_2$ divided by the torque multiplying ratio of the front planetary unit the second turbine $T_2$ is driving the carriers and the output member 100 faster than $T_1$ can drive them. At this point the carriers 88 and 90, through the planet gears 94 rotate the ring gear 96 forward and the rear freewheeler 106—118—116 breaks away. $T_1$ idles in the oil stream neither giving up nor absorbing any appreciable torque. $T_2$ is now driving the car assisted by $T_3$. Second, as the speed of the car increases further $T_2$ reaches its terminal speed and can no longer drive the carriers through the front planetary gear set as fast as $T_3$ can drive them. At this point the front planetary gears 92 drive the sun gear 98 forward, the front freewheeler 106—110—118 breaks away, and $T_2$ idles in the stream of oil. Thereafter as the speed of the car increases $T_3$ continues to drive the car alone, either multiplying the torque of the engine or operating in coupling at substantially one-to-one drive, as is known. Conversely, as the speed of the car decreases the point is reached where the carriers tend to rotate slower than the speed of $T_2$ divided by the torque multiplying ratio of the front planetary gear set. Now $T_2$ rotates the ring gear 82 fast enough to attempt to rotate the sun gear 98 backward. This sets the front freewheeler 106—110—118 so that $T_2$ picks up the drive and assists $T_3$ in driving the car. If the car slows down still more $T_1$ picks up the drive by rotating the sun gear 76 fast enough to try to rotate the ring gear 96 backward which sets up the rear freewheeler 106—118—116 so that $T_1$ picks up the drive and assists the other turbines in driving the car.

For reverse drive the forward brake 112 is released and reverse brake 84 is set to hold front ring gear 82 to act as a reaction gear. This holds $T_2$ stationary during all reverse drive. Now $T_1$ drives the rear input sun gear 76 forward which, because the carrier 90 is initially held by the stationary car, drives the ring gear 96 backward and through the rear one-way clutch 106—118—116 drives the sun gear 98 backwards. This is permitted indeed for although the front freewheeler 106—110—108 tends to lock the member 108 can rotate backward because it is unopposed by the released brake 112. Consequently, the rear freewheeler 106—118—116 acts as a drive clutch for the front sun gear, rotating it backward to rotate the carrier 88 backward because reaction ring gear 82 is held, thus driving the car backward. This also carries the turbine $T_3$ backward positively, but is is possible, depending on blade design, to impress reverse hydraulic torque on $T_3$ so that $T_3$ will assist in driving the car backward. This is because the stationary $T_2$ blades act as a guide wheel or reaction member directing oil from $T_1$ to the front sides of the $T_3$ blades, impressing reverse hydraulic torque on $T_3$.

The rear planetary gear set may have a gear ratio, for example of 2.55 so that when the ring gear 96 is held the sun gear 76 and the first turbine $T_1$ rotate 2.55 times as fast as the carrier 90 and the output member 100. The front planetary gear set may have a ratio of about 1.6 so that when the sun gear 98 is held the ring gear and second turbine $T_2$ rotate at 1.6 times the speed of the carriers. The third turbine $T_3$ and the output member 100 always rotate together. Thus, at any speed torque delivered to the output member 100 by any individual turbine equals the value of hydraulic torque on the turbine (taking into account its algebraic sign or sense of rotation) multiplied by the mechanical advantage of its connection to the output shaft. Therefore, at stall that is when the car is stationary but the impeller is rotating, although turbine $T_3$ may even exert a negative torque on the output member 100 the entire torque converter has a high positive torque ratio because this negative torque of $T_3$ is less than the high torque of the first turbine multiplied by the mechanical advantage of its connection to the output. At stall the torque ratio of the torque converter over all may be of the order of four to one. The torque ratio of the torque converter, as a whole, decreases until the speed of the $T_3$ turbine approaches the speed of the impeller I when the torque ratio is substantially unity and the condition known as coupling occurs.

As is known the range of torque multiplication effected by the torque converter increases with increase of the angle through which the blades 70 change the direction of oil between turbine $T_3$ and the impeller I. The connection of the crank 122 to the engine throttle 124 enables this angle to be progressively varied with change of throttle opening and hence in accordance with change of torque demand on the engine. When the torque demand is low, as indicated by a small throttle opening, the stator blades change the direction of the oil relatively little and so provide a relatively low range of torque multiplication. In this condition the blades are said to be at low angle or in low performance position. When the throttle is opened wider, the torque demand on the engine is greater and the vanes are moved toward high angle or high performance position in which they redirect oil from the turbine $T_3$ thru a large angle to the impeller I. This provides an increased range of torque multiplication.

*Structural Arrangement*

As shown in FIGS. 4, 4A, 4B, the transmission housing 22 may include a single tapered casting extending from the differential housing 20 to the universal joint housing 30, provided with shoulders to which may be fastened partitions dividing the transmission housing into the component housings which contain the torque converter, gearing, and clutch. The universal joint housig 30 has the smallest average diameter of the entire group of housings, and it is separated from the rest of the transmission housing by a flange 140 piloted by a rib 141 in the left end of the clutch housing 28 (FIG. 4A) and secured by bolts. A second flange 142 (FIG. 4A) bolted to a shoulder 143 in the main casting separates the clutch housing 28 from the gear housing 26, which in turn is separated from the torque converter housing by a third partition formed by a pair of flanges 146 and 148 bolted to a shoulder 150.

The tapering torque converter casing 24 has a mean or average diameter larger than the greatest diameter of the gear housing 26, whose mean diameter is larger than the mean diameter of the clutch housing 28 which in turn is larger than the mean diameter of the U-joint housing 30.

As shown in FIG. 4, at the front end of the transmission, the drive shaft 42 is supported in the bearing retainer 40 of the universal joint housing 30 by spaced radial bearings 156 and a thrust bearing 158 which latter is preferably of the roller or anti-friction type. The front end of the shaft 42 is splined to a flange 160 by which the shaft 42 may be connected to any suitable propeller shaft, not shown. The flange 160 may be sealed to the housing 40 by any suitable seal 162. The rear end of the shaft 42 forms one end of the universal joint 44, the rear end of which is formed by a clutch input shaft 164 which latter is supported in the universal joint housing in the following way.

A pump casing 166 is dowelled and bolted to the flange 140, which latter includes a tubular portion which contains a bearing sleeve 168 in alignment with a second bearing sleeve 170 in a bore of the pump casing 166. The bearings 168 and 170 radially support the clutch input shaft 164 which is also supported against axial thrust by a thrust bearing 172 similar to the thrust bearing 158. The device as so far described supports the drive shaft 42, clutch input shaft 164, and universal joint 44 radially and axially against thrust in opposite directions. A pump gear 174 is splined to the clutch input shaft and forms part of the customary engine driven or front pump for supplying oil to the transmission, as will be explained.

Referring now to the output device of the transmission, as shown in FIG. 4B the transmission output member 100 is a sleeve formed with an integral radial flange welded to the output shell or casing 102 and splined to a sleeve 178 integral with or secured to a part of the rear planet carrier 90, as will be explained. The sleeve 100 is supported for rotation in a radial bearing 176 in the flange 148. The shell 102 extends around the torque converter and bolted to the flange 104 which is integral with or secured to a central tubular shaft or socket 54 which is the previously mentioned final output shaft 54 of the transmission shown diagrammatically in FIG. 2. The shaft 54 is splined to the differential input shaft 56 which is supported in the differential housing by a front radial bearing 180 and rear radial and thrust bearings 182. Thus the entire output assembly of the transmission consisting of output member 100, shell 102, flange 104 and final output shaft 54 is positioned and supported for rotation in the casing 22 by the front bearing sleeve 176 and by the differential bearings 180, 182 through the differential input shaft 56. A portion of the shaft 54 extends to the left inside the flange 104 to form the previously mentioned inner race 130 of the one-way clutch diagrammatically illustrated in FIG. 2. The outer race 126 of this clutch takes the form of the ring 126 shown in FIG. 4B which surrounds one-way rollers or sprags 128 which are the ratchet members 128 of FIG. 2. The outer race is fixed to a flange 184 which flange is supported for rotation on the inner side of the portion 130 of the shaft 54 by a radial bearing sleeve 186 and is splined to the right-hand end of the transmission input shaft 48. This supports the right-hand end of the shaft for rotation through the bearing sleeve 186 and transmission output shaft 54, differential input shaft 56 and its bearings 180 and 182. The flange 184 is supported against axial thrust by an anti-friction thrust bearing 187 running against the transmission output shaft 54. In the impeller, the customary outer shell 188 carrying impeller blades 62 is riveted to the flange 184 and thus is connected to input shaft 48, the left-hand or front end of which is supported for rotation on the radial bearing sleeve 189 on the end of the clutch input shaft 164 which has been described as supported for rotation from the casing of the transmission by the bearings 168 and 170 (FIG. 4A).

The neutral clutch 46 in the clutch housing 28 includes an internal clutch drum 190 splined to the clutch input shaft 164 and carrying driving plates or disks which are interleaved with driven plates or disks carried by an external clutch drum 192 splined to the front end of the transmission input shaft 48. The clutch may be engaged by fluid under pressure in an expandable chamber 194 enclosed in the external clutch drum 192 by a piston 196 which operates any suitable force multiplying device, such as a Belleville washer or spring 198 to urge a clamping plate 200 to the right to engage the driving and driven plates. The Belleville spring forms the return mechanism for the piston 196 when the pressure in chamber 194 is released.

The various shafts of the torque converter and gearing will be described in the order in which they are placed with reference to the axis of the transmission.

The transmission input shaft 48 is at the axis. Surrounding the input shaft and spaced from it to form a stator control passage is a stator support or ground sleeve 210 which extends forward through the gearing and is piloted at its front end in the partition 142 and fixed against rotation. The right or rear end of the sleeve 210 is supported by a bearing sleeve 212 on the transmission input shaft 48. The second turbine shaft 80 outside the ground sleeve 210 is radially supported for rotation at its front end by a bearing sleeve 214 on the front end of the ground sleeve 210, and at its rear end by a bearing sleeve 216 in the rear end of the third turbine shaft 86 which in turn is supported by a bearing sleeve 218 in the rear end of the first turbine shaft 74 which in turn is supported by bearing sleeve 220 in the output sleeve 178, referred to, which in turn is supported by the bearing sleeve 176. Thus the rear ends of all of the rotating turbine assemblies are supported radially from the transmission housing 22 by the flange 148 and the stack of bearings 176–220–218–216. The third turbine shaft 86 extends forward through both gearsets and is supported at its left end for rotation by a bearing sleeve 222 on the second turbine shaft 80.

The first turbine blades 64 are fixed to the first turbine shaft 74 by being attached to the shell 72 which is disposed just inside the shell 102 and at its center is riveted to a flange or hub 224 which may be integral with the shaft 74.

The second turbine $T_2$ is attached to its output shaft 80 through the spider 78 which at its center is splined to the rear end of the shaft 80.

The third turbine blades 68 are secured to an outer shell 226 which latter is riveted to a hub 228 splined to the right end of the $T_3$ shaft 86.

The $T_1$ shaft 74 extends forward from the torque converter to the rear planetary gear set and at its front end is splined to the sun gear 76 which meshes with the planet pinions 94 journaled on the carrier 90. This carrier includes spindles 230 supported between a rear flange 232 formed integral with the output sleeve 178 and a front flange 234 which is splined to the $T_3$ shaft 86. The $T_2$ shaft 80 extends forward through both planetary gear sets, and is formed with an integral flange 235 at its front end which is riveted to the ring gear 82. The front planet gears 92 are mounted on the front carrier 88 which includes spindles 236 supported in a front flange 238 splined to a flange 240 integral with the $T_3$ shaft 86. The front sun gear 98 is formed integral with the freewheeler sleeve 106 and this supports side by side the two sets of rollers or sprags 110 and 118 which are the ratchet members 110 and 118 diagrammatically illustrated in FIG. 2. Thus the sleeve 106 forms two center races for the two freewheelers 106—110—108 and 106—118—116. The right-hand portion of the sleeve 106 on which is the path or track of the rollers 118 forms one inner race for the free-wheeler 106—118—116 while the left-hand portion of the sleeve on which is the path of the rollers 110 forms the inner race of the free-wheeler 106—110—108. Outside the ratchet members 118 is the rear or inner race 116 which is splined to the rear ring gear 96. The forward freewheeler includes the forward or outer race 108, previously referred to, which is splined to drum 242 splined to a conical brake drum 244 which corresponds to the brake 112 in FIG. 2. The race 108 of the front freewheeler can be positively held against rotation by clamping the brake drum 244 between a stationary cone 246 secured to the transmission casing and a nonrotatable but slidable cone 248 which may be urged to the left, to overcome a return spring 250, by an annular piston 252 which can be urged forward by the pressure of oil supplied by any suitable means to an expandable chamber 254 formed in the flange 146.

The front ring gear 82 is formed integral with a drum 256 splined to a conical brake drum 258 (corresponding to the reverse brake 84 in FIG. 2) which may be held by clamping between a stationary cone 260 secured to the transmission casing and a nonrotatable but slidable cone 262 which may be urged to the right to overcome the return spring 264 by a force multiplying actuator such as a Belleville washer or spring 266 which can be urged to the right by a primary piston 268 movable by fluid pressure in a cylinder 269 and assisted by a secondary piston 270 actuated by fluid pressure in an expandable chamber 272 formed in the flange 142. A return spring 274 between the cones 244 and 258 assures disengagement of either cone when its energizing actuator is released.

FIGS. 5 and 6 show one form of construction of freewheelers 108—110—106 and 116—118—106. The rear or outer race 116 has pockets 276 having sloping cam surfaces 278 and contain the rollers 118 which are urged to the narrow end of the pockets by energizing springs 280 to engage the cams 278 and the center race 106, as is known. When the outer race 116 tends to rotate counterclockwise with reference to the center race 106, as is seen in FIG. 6, the clutch locks the races together. When the outer race tends to rotate clockwise with respect to the center race, the rollers 118 are released and the outer race can turn with respect to the center race. As shown in FIG. 5 the forward freewheeler 108—110—106 is similar to the rear freewheeler and has pockets 276′ containing rollers 110 and energizing springs 280, the only difference being that the cam surfaces 278′ slope oppositely to the cam surfaces 278 so that when the center race 106 tends to rotate counterclockwise with respect to the forward or outer race 108 the rollers 110 lock the races together.

When cam and roller clutches are used, as above described, the pair of freewheelers is characterized by oppositely sloping cam faces 278 and 278′. Alternatively any suitable known form of sprags may be used instead of the rollers and where sprag clutches are used the pair of clutches is characterized by oppositely sloping sprags. Each individual sprag clutch may be of any suitable form known in the art, for example that shown in my U.S. Patent 2,919,608 issued Jan. 5, 1960 on application filed August 2, 1956.

The reaction device, guide wheel or stator R is constructed as shown in FIG. 4B, described at further length below. The stator includes an annular support 290 which can turn on bearing sleeves 291 adjacent the rear end of the ground sleeve 210.

The transmission includes suitable thrust bearings to take up the various complex axial forces that occur in the operation of the device. The rearward thrust of the impeller is taken by the flange 104 through the thrust bearing 187, referred to, which is disposed in a suitable axial recess in the flange 184. Rearward thrust on the stator support 290 is taken by a thrust bearing 292 placed in an axial recess in the flange 184. Forward thrust on the first turbine $T_1$ is taken by the shell 102 through a thrust being 294 disposed in an axial recess in the $T_1$ hub 224, which hub takes the thrust of the third turbine $T_3$ through a similar thrust bearing 296 in an axial recess in the hub 228, which latter takes the thrust of the second turbine $T_2$ through a thrust bearing 298 disposed in an axial recess in the hub of the second turbine $T_2$. A thrust bearing 300 is placed between the hub of the second turbine $T_2$ and the stator support 290.

In the planetary gear a system of thrust bearings is provided to take up both forward and rearward thrust. Starting from the front of the gearing any forward thrust on the front ring gear 82 is taken by a thrust bearing 302 which bears against the stationary flange 142. The flange 235 of the second turbine shaft which bears against the thrust bearing 302 takes any forward thrust from the front carrier. This is transmitted to the bearing 304 by The sun gear 98 in turn can absorb the forward thrust ward thrust from the sun gear 98 through a bearing 306. the sun gear 98 in turn can absorb the forward thrust from the rear carrier through the bearing 309 on the rear end of the center race 106 and the rear carrier in turn can absorb forward thrust from the rear sun gear 76 through the bearing 310. When the ring gear 96 is locked against reverse rotation during forward drive, forward thrust on the ring gear is transmitted through the ratchet members 118 to the sun gear 98 where it is taken by the bearing 306. During reverse drive the sun gear rotates, but the bearing 306 takes the forward thrust from the ring gear 96, as before explained.

Rearward thrust from the rear carrier 90 is taken by the flange 146 through a thrust bearing 312 and the rear cheek or flange 232 of the carrier takes any rearward thrust of the sun gear 76 through a thrust bearing 314. The sun gear in turn can absorb rearward thrust from the ring gear 96 through the thrust bearing 310 which supports the forward cheek or flange 232 of the carrier 90 against thrust which it in turn receives from the ring gear through a bearing 316 from the race 116. Any rearward thrust on the sun gear 98 is taken by the bearing 309 and transmitted to the bearing 310. Any rearward thrust on the front carrier is taken by the bearing 306 and any rearward thrust on the ring gear 82 is taken by the bearing 304.

I claim:
1. A uni-directional torque-transmitting device comprising in combination a first reaction gear, a second reaction gear, a pair of inner races disposed side by side, rotatably mounted with respect to the first reaction gear and non-rotatably connected to each other and to the second reaction gear; a first outer race surrounding a first of the inner races; means for selectively permitting or preventing rotation of said first outer race; a second outer race surrounding the second inner race and non-rotatably connected to the first reaction gear; means automatically responsive to tendency of the first inner race to rotate in one sense with respect to the first outer race for transmitting torque in only said one sense of rotation from the first inner race to said first outer race, said inner races being freely rotatable in the opposite sense with respect to said first outer race; and means automatically responsive to tendency of the second inner race to rotate in the opposite sense with respect to the second outer race for transmitting torque in only said opposite sense of rotation from the second inner race to the second reaction gear.

2. A uni-directional torque-transmitting device comprising in combination a first reaction gear which is rotatable at times, a second reaction gear which is rotatable at times, a pair of inner races disposed side by side, rotatably mounted with respect to said first reaction gear and non-rotatably connected to each other and to the second reaction gear; a first outer race surrounding one inner race; means for selectively permitting or preventing rotation of said first outer race; a second outer race surrounding the second inner race and non-rotatably connected to the first reaction gear; means automatically responsive to tendency of the first inner race to rotate in one sense with respect to the first outer race for transmitting torque in only said one sense of rotation from the first inner race to said first outer race, said inner races being freely rotatable in the opposite sense with respect to said first outer race; and means automatically responsive to tendency of the second outer race to rotate in the same sense with respect to the second inner race for transmitting torque in only said same sense of rotation from the first reaction gear to the second inner race, said first reaction gear being freely rotatable in said opposite sense with respect to said second inner race.

3. A torque transmitting device comprising in combination inner race means, a pair of separately rotatable outer races surrounding the inner race means side by side, means for selectively permitting or preventing rotation of one outer race, means automatically responsive to tendency of the inner race means to rotate in one sense with respect to said one outer race for transmitting torque in only said one sense of rotation from the inner race means to said one outer race, said inner race means being freely rotatable in the opposite sense with respect to said one outer race, and means automatically responsive to tendency of the inner race means to rotate in the opposite sense with respect to the other outer race for transmitting torque in only said opposite sense of rotation from the inner race means to the other outer race, the inner race means being freely rotatable in said one sense with respect to the other outer race.

4. A uni-directional torque-transmitting device comprising in combination first and second reaction gears, inner race means; first and second separately rotatable outer races surrounding the inner race means side by side; first torque transmitting means automatically responsive to tendency of the inner race means to rotate in one sense with respect to the first outer race for transmitting torque in only one said sense of rotation from the inner race means to the first outer race, the inner race means being freely rotatable in the opposite sense with respect to said first outer race; means for selectively permitting or preventing rotation of the first outer race in said one sense of rotation; a connection preventing relative rotation between the inner race means and the first reaction gear; a connection preventing relative rotation between the second outer race and the second reaction gear; second torque transmitting means automatically responsive to tendency of the second reaction gear to rotate in said one sense with respect to the inner race means for transmitting torque only in the said one sense of rotation from the second reaction gear to the inner race means; and means for positively rotating the second reaction gear in said one sense while permitting rotation of said first outer race in said one sense to rotate the first reaction gear in said one sense.

References Cited in the file of this patent

UNITED STATES PATENTS

| Re. 22,767 | Starkey | June 11, 1946 |
| 455,549 | Sternoff-Beyer | July 7, 1891 |
| 1,337,634 | Benson | Apr. 20, 1920 |
| 2,061,288 | Murray | Nov. 17, 1936 |
| 2,390,204 | Curtis | Dec. 4, 1945 |
| 2,441,926 | Zahn et al. | May 18, 1948 |
| 2,884,809 | Moore | May 5, 1959 |
| 2,886,152 | Cobb | May 12, 1959 |

UNITED STATES PATENT OFFICE
CERTIFICATE OF CORRECTION

Patent No. 3,053,361  September 11, 1962

Gilbert Kenneth Hause

It is hereby certified that error appears in the above numbered patent requiring correction and that the said Letters Patent should read as corrected below.

Column 1, line 67, for "of" read -- to --; column 6, line 7, for "is", first occurrence, read -- it --; column 10, line 21, after "by" insert -- the flange 240 on the $T_3$ shaft which in turn takes forward thrust from the sun gear 98 through a bearing 306. --; lines 23 and 24, strike out "ward thrust from the sun gear 98 through a bearing 306. the sun gear 98 in turn can absorb the forward thrust".

Signed and sealed this 29th day of January 1963.

(SEAL)
Attest:

ERNEST W. SWIDER
Attesting Officer

DAVID L. LADD
Commissioner of Patents